United States Patent
Yamamoto et al.

(10) Patent No.: US 6,978,755 B2
(45) Date of Patent: Dec. 27, 2005

(54) AIR INTAKE APPARATUS OF ENGINE

(75) Inventors: Hiroki Yamamoto, Obu (JP); Hitoshi Takeuchi, Obu (JP)

(73) Assignee: Aisan Kogyo Kabushiki Kaisha, Aichi-ken (JP)

( * ) Notice: Subject to any disclaimer, the term of this patent is extended or adjusted under 35 U.S.C. 154(b) by 59 days.

(21) Appl. No.: 10/735,828

(22) Filed: Dec. 16, 2003

(65) Prior Publication Data

US 2004/0123826 A1 Jul. 1, 2004

(30) Foreign Application Priority Data

Dec. 26, 2002 (JP) ........................................ 2002-376339

(51) Int. Cl.$^7$ .............................................. F02M 35/10
(52) U.S. Cl. ............................. 123/184.49; 123/184.53
(58) Field of Search ........................... 123/54.4, 184.36, 123/184.44, 184.49, 184.53, 184.59, 184.61

(56) References Cited

U.S. PATENT DOCUMENTS 6,135,418 A  10/2000  Hatton

FOREIGN PATENT DOCUMENTS

| DE | 19605380 | 8/1997 |
|----|----------|--------|
| DE | 19830379 | 2/1999 |
| JP | 9125970 | 5/1997 |
| JP | 2000234522 | 8/2000 |
| JP | 2002242681 | 8/2002 |
| WO | 0231341 | 4/2002 |

Primary Examiner—Noah P. Kamen
(74) Attorney, Agent, or Firm—Stevens, Davis, Miller & Mosher, LLP

(57) ABSTRACT

In an air intake apparatus of an internal combustion engine, disassembling a surge tank made of resin with an intake air control valve into divided pieces, and bonding the divided pieces by vibration adhesion, for preventing the intake air control valve from breaking or characteristic thereof from changing during the vibration adhesion or for ensuring a sealing property between parts, an inner space in the surge tank is divided into first and second chambers by providing a horizontal partitioning wall within the surge tank. The surge tank is divided into a middle piece made of resin and formed integrally with the partitioning wall, a lower piece made of resin, and an upper piece also made of resin, and these three pieces are bonded by the vibration adhesion to form the surge tank. A communicating hole for making the first chamber communicate with the second chamber is formed in the partitioning wall, and a valve body for opening and closing the communication hole is provided in the communicating hole. A drive device for opening and closing the valve body is provided on the middle piece.

4 Claims, 5 Drawing Sheets

AIR INTAKE APPARATUS OF ENGINE

BACKGROUND OF THE INVENTION

1. Field of the Invention

The present invention relates to an air intake apparatus of an engine, in particular, of an internal combustion engine.

2. Description of Related Art

Hitherto, as an air intake apparatus of an engine, in particular, of an internal combustion engine, the air intake apparatus is known which includes an intake duct connected to an air cleaner, a surge tank connected to a downstream portion of the intake duct, and a plurality of intake branch pipes connecting the surge tank and the engine. The air intake apparatus is further provided with an intake air control valve in a dividing portion which divides the surge tank into a first surge tank and a second surge tank, and is formed so that resulting from the full opening of the intake air control valve, the first surge tank and the second surge tank are communicated with each other and resulting from the full closing thereof, the communication between the first surge tank and the second surge tank is shut off.

In addition, in the above-described apparatus, by controlling the intake air control valve so as to open and close the valve depending on the driving states of the engine, that is, by closing the valve when the engine drives in the state of high load and low speed rotation, and by opening the valve when the engine drives in the state of high load and high speed rotation, an equivalent pipe length of an air intake passage is changed so that a high charging efficiency can be ensured over a whole range of revolution speed of the engine by utilizing an inertia effect of an intake air.

As to such an air intake apparatus of the internal combustion engine as described above, the structure shown in FIG. 5 is conventionally known. (Refer to JP-A-9-125970.)

In the air intake apparatus shown in FIG. 5, a surge tank portion includes a surge tank 103 having a receiving portion 102 for receiving an outside surface of an intake air control valve 101 of which the open and close operation is controlled depending on the states of the engine and having inside a shape corresponding to that of the intake air control valve 101, and is provided with a first divided body (lower piece) 104 made of resin which includes an entire body of the receiving portion 102 and has a part of the surge tank 103 integrally, and a second divided body (upper piece) 105 made of resin which has a remaining part of the surge tank 103 integrally and bonded to the first divided body 104 by means of a method of vibration adhesion. The receiving portion 102 has an outer surface continuing a divided line between the first and second divided bodies 104 and 105, and the second divided body 105 integrally includes an inner wall in a shape corresponding to that of the outside surface of the receiving portion 102, and by bonding the first and second divided bodies 104 and 105 to each other on respective adhesion surfaces 106 and 107 by means of the method of the vibration adhesion, an inner wall in the second divided body 105 is simultaneously bonded to the outside surface of the receiving portion 102 by the vibration adhesion.

Further, the intake air control valve 101 is constituted so as to be arranged in the receiving portion 102 through an inserting hole 108 formed in the first divided body 104, and the intake air control valve 101 comprises a holder 110, a rotation shaft 111, a butterfly valve body 112 and a flange portion 113, and the flange portion 113 is fixedly secured to the first divided body 104 with bolts 114. Furthermore, a seal ring 115 is disposed on an outer periphery of the holder 110.

In the above conventional structure, when the first divided body 104 and the second divided body 105 are bonded to each other by means of the vibration adhesion, since the rigidity of the receiving portion 102 is low, there is a fear of causing deformation of the receiving portion 102 due to the vibration, and thereby, there is a fear of causing insufficient vibration adhesion of the receiving portion 102 to the second divided body 105.

Additionally, since the air intake apparatus has a structure in which the holder 110 assembled with the intake air control valve 101 is inserted through an insertion hole 108 formed in the first divided body 104 and is arranged in the receiving portion 102, there are caused problems that a seal between the holder 110 and the receiving portion 102 requires a high precision, and moreover a sealing property between the holder 110 and the receiving portion 102 is lowered by a permanent set in fatigue of a seal ring 115 caused due to aging deterioration.

SUMMARY OF THE INVENTION

It is an object of the present invention to provide an air intake apparatus of an engine, in particular, of an internal combustion engine, which can solve above-described problems.

For solving the above-described problems, according to the invention, there is provided an air intake apparatus of an internal combustion engine in which a horizontal partition wall is provided within a surge tank to divide an inner space of the surge tank into first and second chambers, and an intake air introduced into the first chamber is supplied to one group of intake branch pipes and an intake air introduced into the second chamber is supplied to the other group of intake branch pipes, wherein the surge tank is divided into a middle piece made of resin and formed integrally with the partitioning wall, a lower piece made of resin and arranged on a bottom side of the middle piece, and an upper piece made of resin and arranged on an upper side of the middle piece, these respective pieces are bonded to each other by means of a method of vibration adhesion to form the surge tank, wherein a communicating hole for making the first chamber communicate with the second chamber is formed in the partitioning wall provided in the middle piece, a valve body of an intake control valve for opening and closing the communicating hole is provided in the communicating hole, and a drive means for controlling the valve body so as to open and close it is provided on the middle piece.

In this invention, in bonding the middle piece, the lower piece and the upper piece to each other by means of the method of vibration adhesion, the middle piece is fixed by a jig so as not to be vibrated, and the lower piece and the upper piece are vibrated to be bonded to the middle piece. Since, during this vibration adhesion, the middle piece is not vibrated, the intake air control valve provided on the middle piece is not broken nor is changed its control characteristic. In addition, by forming the middle piece substantially in a plate shape and vibrating both pieces in a plate surface direction of the middle piece during the vibration adhesion, rigidity of the middle piece with respect to the vibration can be increased, and the breakage and the change in the control characteristic of the intake air control valve can further be prevented.

Furthermore, since the surge tank is divided in a state where the partitioning wall is not divided, a sealing property between the first chamber and the second chamber which are divided by the partitioning wall can be ensured.

In the invention, the structure may be formed that the valve body is formed in a plate shape and has seal members in peripheral fringes of the valve body, and seat surfaces with which the seal members of the valve body are brought into contact are formed by the partitioning wall.

With such a structure, during closing the valve body, the seal members provided in the valve body are brought into contact with the seat surfaces formed by the partitioning wall itself.

Furthermore, in the invention, the structure may be formed that a rotation shaft of the valve body is provided on the middle piece, the rotation shaft and a drive shaft of the drive means are separately formed, and the drive shaft and the rotation shaft are rotated integrally with each other resulting from annexing the drive means to the middle piece.

In this structure, since the intake air control valve is formed independent of the drive means, a common use of the same drive means can be realized with respect to the intake air control valves different in a type of machine.

DETAILED DISCRIPTION OF THE INVENTION

A preferred embodiment according to the present invention will be described on the basis of an embodiment shown in FIGS. 1 to 4.

Figure 1:
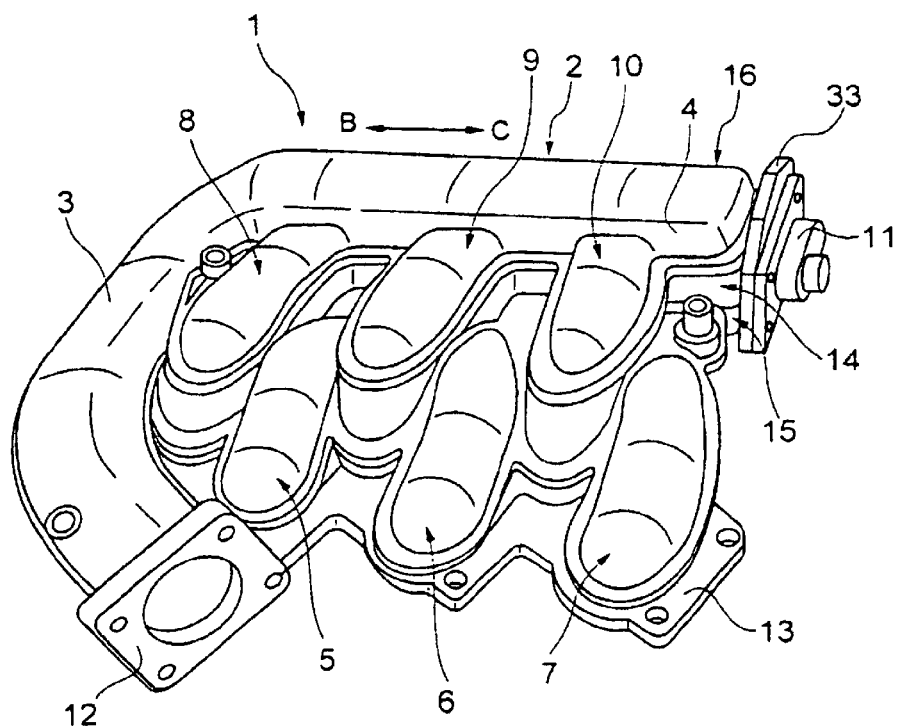
FIG. 1 is a perspective view showing an embodiment of an air intake apparatus according to the present invention.
Figure 2:
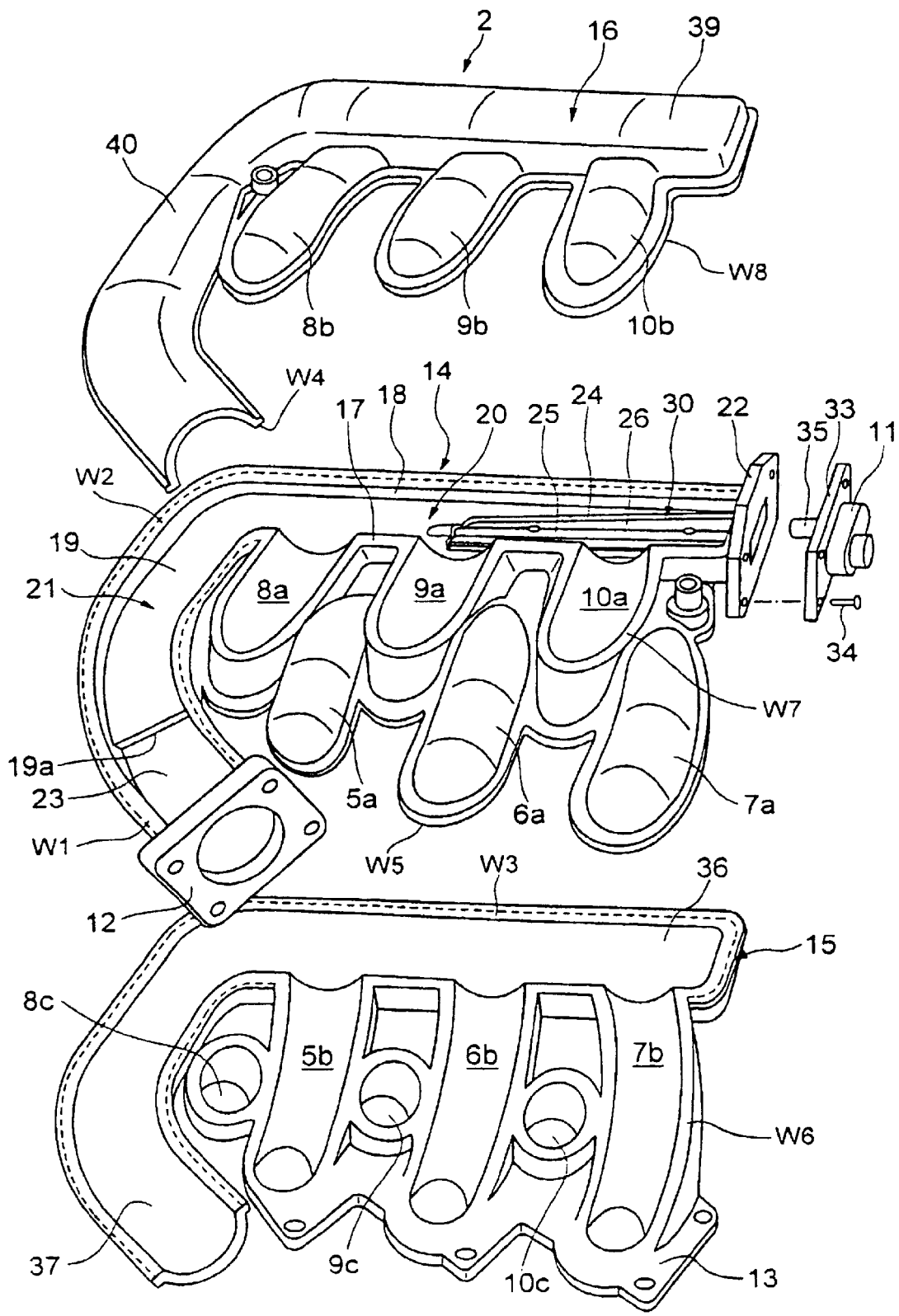
FIG. 2 is an exploded view in perspective of the air intake apparatus in FIG. 1.
Figure 3:
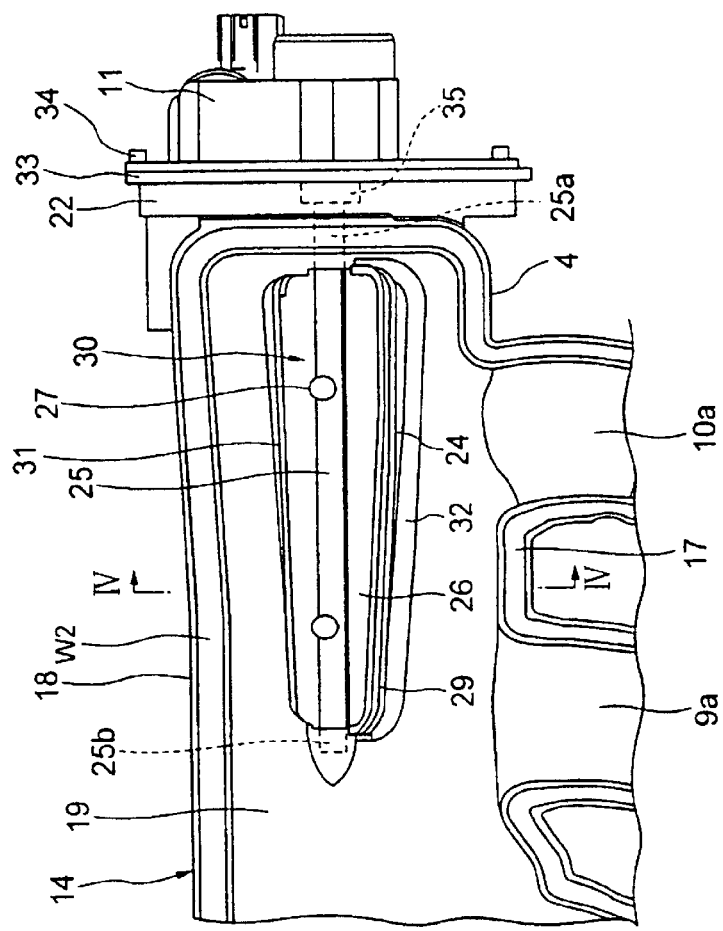
FIG. 3 is a plan view of an essential portion in the present invention in a state where a drive means is annexed to a middle piece shown in FIG. 2.
Figure 4:
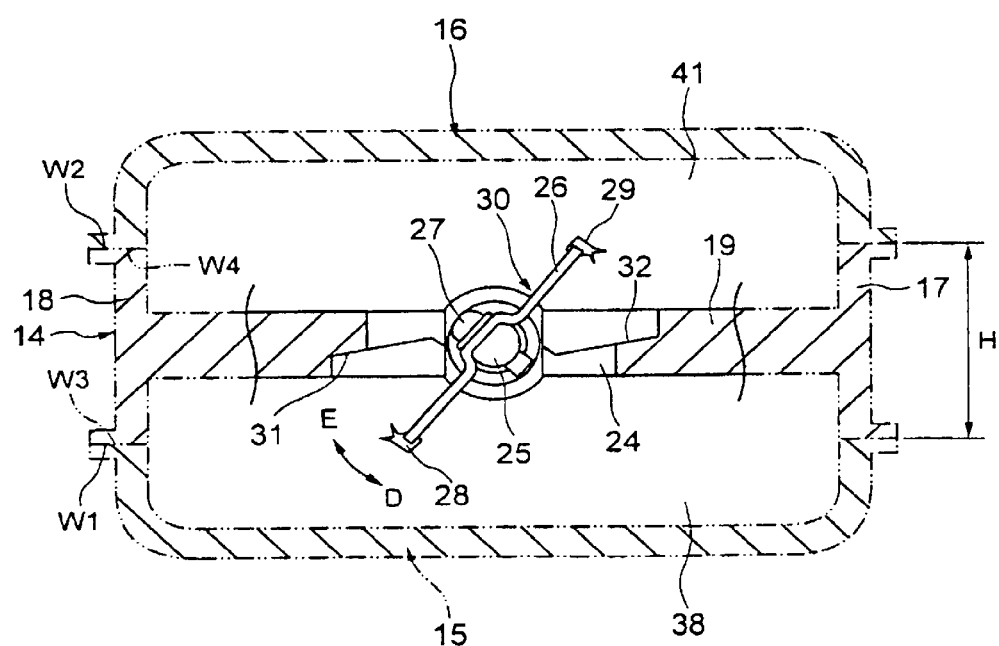
FIG. 4 is a schematic sectional view taken along a line IV—IV in FIG. 3, in which an intake air piping system is not shown.
Figure 5:
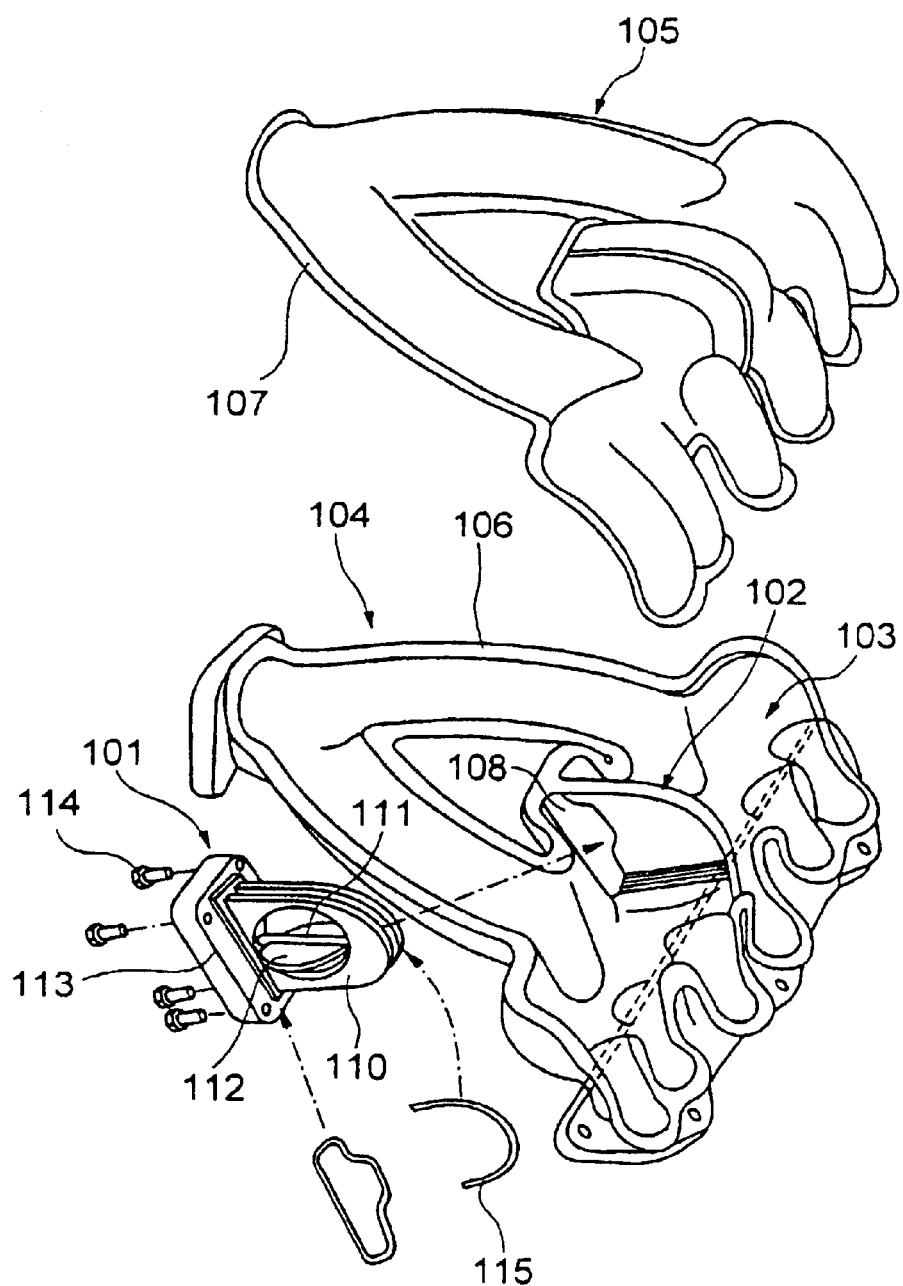
FIG. 5 is an exploded view in perspective showing a conventional air intake apparatus.

FIG. 1 shows an air intake apparatus of an internal combustion engine according to the invention, and is a perspective view of the intake apparatus in a state assembling respective parts. FIG. 2 is a perspective view disassembling component parts in FIG. 1. FIG. 3 is a plan view of a middle piece in FIG. 2. FIG. 4 is a sectional view taken along a line IV—IV in FIG. 3.

Meanwhile, although the invention is applied as the air intake apparatus of a multiple-cylinder internal combustion engine, the embodiment is an example applied to the air intake apparatus including six pieces of intake branch pipes for introducing an intake air into respective cylinders of an internal combustion engine of six cylinders.

As shown in FIG. 1, an air intake apparatus 1 includes a surge tank 2, an intake duct 3 which is provided in a continuous manner on one end in a longitudinal direction of the surge tank 2 and used for introducing the intake air from a throttle body not shown into the surge tank 2, two groups of intake branch pipes 5 through 7 and intake branch pipes 8 through 10 which are provided in a continuous manner on one side surface 4 of a side orthogonal to the longitudinal direction (B–C direction) of the surge tank 2, and into which the intake branch pipes are divided such that an air intake operation of each cylinder is not sequent in the same group, drive means 11 which is provided on an other end in the longitudinal direction of the surge tank 2 and used for opening and closing an intake air control valve provided within the surge tank 2, a flange 12 for connecting the intake duct 3 to the throttle body, and a flange 13 for connecting the intake branch pipes 5 through 10 to the engine not shown.

Then, a structure of each portion will be described in detail with reference to FIG. 2 through FIG. 4.

As shown in FIG. 2, the surge tank 2, the intake duct 3, and the intake branch pipes 5 through 10 are constituted by a middle piece 14 arranged at a mid position of the intake apparatus in a vertical direction, a lower piece 15 arranged on a bottom side of the middle piece 14, and an upper piece 16 arranged on an upper side of the middle piece 14, and are divided into these three pieces. These respective pieces 14 through 16 are formed of thermoplastic resin such as, for example, polyamide resin which can be bonded by means of a method of vibration adhesion.

The middle piece 14 includes both side walls 17 and 18 which form a height H (refer to FIG. 4) with substantially the same dimension over the surge tank 2 portion and the intake duct 3 portion, and a partitioning wall 19 which is positioned at a mid position in a height direction of both side walls 17 and 18, is extended between both side walls so as to be arranged in a horizontal direction, and is formed integrally with both side walls 17 and 18, and the middle piece 14 has a surge tank constituting portion 20 and an intake duct constituting portion 21. Bottom surfaces and upper surfaces of both side walls 17 and 18 respectively form adhesion surfaces W1 and W2.

At an end portion of the intake duct constituting portion 21 in both of the side walls 17 and 18 of the middle piece 14, the flange 12 is provided by an integral forming. Furthermore, at the end portion in a longitudinal direction of the surge tank constituting portion 20 in both of the side walls 17 and 18 of the middle piece 14, a flange 22 is provided by the integral forming.

In addition, an end portion 19a in the partitioning wall 19 on a side of the intake duct constituting portion 21 is apart from the flange 12, and a communicating hole 23 is formed between the end portion 19a and the flange 12. Further, in the surge tank constituting portion 20 of the partitioning wall 19, a communicating hole 24 is formed in a position close to the flange 22. In the communication hole 24, as shown in FIG. 3, a rotation shaft 25 is arranged in the longitudinal direction of the surge tank 2, a proximal end portion 25a of the rotation shaft 25 is rotatably supported to the flange 22, and a distal end portion 25b thereof is rotatably supported to the partitioning wall 19. Meanwhile, an end of the proximal end portion 25a of the rotation shaft 25 is positioned within the flange 22, and a drive shaft 35 of an actuator 11, which will be described later, is formed to be connected to the proximal end portion 25a of the rotation shaft 25. Additionally, with respect to the proximal end portion 25a and the distal end portion 25b of the rotation shaft 25, sliding bearing portions made of different material from that of the middle piece 14 are provided in the middle piece 14, so as to improve smoothness of rotation of the rotation shaft 25.

A plate shaped valve body 26 is fixedly secured on the rotation shaft 25 by screws 27, through the rotation of the rotation shaft 25, the valve body 26 is formed so as to perform an opening and closing operation. Furthermore, on a peripheral fringe of the valve body 26, as shown in FIG. 3 and FIG. 4, seal members 28 and 29 made of such as rubber are provided. An intake air control valve 30 is constituted of the rotation shaft 25 and the valve body 26.

Seat surfaces 31 and 32 with which the peripheral fringes of the valve body 26, that is, the seal members 28 and 29 are brought into contact, are formed in an outer peripheral portion of the communicating hole 24 in the partitioning wall 19, and the communicating hole 24 is formed such that it is opened by rotating the valve body 26 in a D direction of an arrow in FIG. 4 and is closed by bringing the seal members 28 and 29 into contact with the seat surfaces 31 and 32 by rotating the valve body 26 in an E direction of the arrow.

The actuator 11 serving as the drive means of the rotation shaft 25 is provide on an outer surface of the flange 22 by fixedly securing a flange 33 of the actuator 11 to the outer surface of the flange 22 of the middle piece 14 with fixing means 34 such as vises, laser welding, or others. By providing the actuator 11 in a fixed manner, the drive shaft 35 of the actuator 11 is connected to the proximal end portion 25a of the rotation shaft 25, and the rotation shaft 25 is formed in a manner to be rotated integrally with the rotation of the drive shaft 35.

The lower piece 15 includes a surge tank constituting portion 36 arranged on a bottom side of the surge tank constituting portion 20 in the middle piece 14, and an intake duct constituting portion 37 arranged on a bottom side of the intake duct constituting portion 21 in the middle piece 14. A peripheral fringe of the surge tank constituting portion 36 and of the intake duct constituting portion 37 forms an adhesion surface W3 which will be bonded to the adhesion surface W1 of the middle piece 14. Then, by arranging the lower piece 15 on the bottom side of the middle piece 14 by bonding them at the adhesion surfaces W1 and W3, the first chamber 38 is formed within the surge tank 2 with the partitioning wall 19 of the middle piece 14 and the surge tank constituting portion 36 of the lower piece 15, and a lower intake air passage communicating with the first chamber 38 is formed with the intake duct constituting portion 21 of the middle piece 14 and the intake duct constituting portion 37 of the lower piece 15.

In addition, the upper piece 16 includes a surge tank constituting portion 39 arranged on an upper side of the surge tank constituting portion 20 in the middle piece 14 and an intake duct constituting portion 40 arranged on an upper side of the intake duct constituting portion 21 in the middle piece 14. A peripheral fringe of the surge tank constituting portion 39 and of the intake duct constituting portion 40 forms as an adhesion surface W4 which will be bonded to the adhesion surface W2 of the middle piece 14. Then, by arranging the upper piece 16 on the upper side of the middle piece 14 by bonding them at the adhesion surfaces W2 and W4, a second chamber 41 is formed within the surge tank 2 by the partitioning wall 19 of the middle piece 14 and the surge tank constituting portion 39 of the upper piece 16, and an upper intake air passage communicating with the second chamber 41 is formed by the intake duct constituting portion 21 of the middle piece 14 and the intake duct constituting portion 40 of the upper piece 16.

Branch pipe constituting walls 5a through 7a forming an upper half portion in the one group of intake branch pipes 5 through 7, as mentioned above, are formed integrally with the middle piece 14. On a peripheral fringe of the branch pipe constituting walls 5a through 7a, an adhesion surface W5 is formed.

Moreover, branch pipe constituting walls 5b through 7b forming a lower half portion of the one group of intake branch pipes 5 through 7 are formed integrally with the lower piece 15. On a peripheral fringe of the branch pipe constituting walls 5b through 7b, an adhesion surface W6 is formed. Further, in tip portions of the branch pipe constituting walls 5b through 7b, the flange 13, as mentioned above, is formed integrally with the lower piece 15.

Then, by arranging the lower piece 15 on the bottom side of the middle piece 14 by bonding them to each other, the branch pipe constituting walls 5a through 7a of the middle piece 14 are bonded to the branch pipe constituting walls 5b through 7b of the lower piece 15, and by bonding the adhesion surfaces W5 and W6 of both of the constituting walls, the intake branch pipes 5 through 7 are formed in which one end thereof is communicated with the first chamber 38 of the surge tank 2 portion and the other end is communicated with the engine.

Besides, branch pipe constituting walls 8a through 10a forming a lower half portion in the other group of intake branch pipes 8 through 10 are formed integrally with the middle piece 14. On a peripheral fringe of the branch pipe constituting walls 8a trough 10a, an adhesion surface W7 is formed.

Furthermore, branch pipe constituting walls 8b through 10b forming an upper half portion of the other group of intake branch pipes 8 through 10 are formed integrally with the upper piece 16. On a peripheral fringe of the branch pipe constituting walls 8b through 10b, an adhesion surface W8 is formed.

In addition, by arranging the upper piece 16 on the upper side of the middle piece 14 by bonding them to each other, the branch pipe constituting walls 8a through 10a of the middle piece 14 are bonded to the branch pipe constituting walls 8b through 10b of the upper piece 16, and by bonding the adhesion surfaces W7 and W8 of both of the constituting walls, the intake branch pipes 8 through 10 are formed in which one end thereof is communicated with the second chamber 41 of the surge tank 2 and the other end is communicated with the engine. Holes 8c through 10c communicating the intake branch pipes 8 through 10 with the engine are formed in the flange 13. End surfaces of the branch pipe constituting walls 8a through 10a and outer peripheral surfaces of the holes 8c through 10c constitute the adhesion surfaces W5 and W6, so as to be bonded to each other.

Next, with regard to assembling of the above-mentioned component parts will be described.

First, by inserting the rotation shaft 25 from a side of the flange 22 of the middle piece 14, the rotation shaft 25 is rotatably arranged in a central portion of the communicating hole 24 as shown in FIG. 3. Meanwhile, when slide bearing portions are provided, the rotation shaft 25 is inserted in these slide bearing portions. Secondly, the valve body 26 is fixedly secured to the rotation shaft 25 through the use of screws 27, so as to form the intake air control valve 30.

Thirdly, in a state where the middle piece 14 is fixed so as not to vibrate by utilizing a jig, the lower piece 15 is arranged on the bottom side of the middle piece 14 in a state where the adhesion surfaces are brought into contact with each other, and the upper piece 16 is arranged on the upper side of the middle piece 14 in a state where the adhesion surfaces are also brought into contact with each other, and then, by means of the method of the vibration adhesion, the lower piece 15 and the upper piece 16 are vibrated in the B and C directions of the arrow as shown in FIG. 1, to subject the respective adhesion surfaces to the vibration adhesion, and thus, the lower piece 15 and the upper piece 16 are fixedly secured to the middle piece 14.

During this vibration adhesion, since the intake air control valve 30 is provided in the middle piece which is not vibrated, the intake air control valve 30 can be prevented from being broken by the vibration or it can prevent the opening and closing characteristics of the control valve 30 from changing, which results from vibration. Additionally, since the middle piece 14 is formed in a substantially plate shape, and is vibrated in a plate surface direction (longitudinal B–C direction) of the plate shaped middle piece 14, the rigidity of the middle piece 14 with respect to the vibration is high. Therefore, the vibration adhesion can be performed positively, and thus, tightly attaching bonding at the respective adhered portions can surely be executed, and it can surely prevent an intake air leakage in the bonded portions between the respective pieces.

After the above-described vibration adhesion, the flange 33 of the actuator 11 is fixedly secured to the flange 22 of the middle piece 14 by utilizing fixedly securing means 34 such as vises, laser beam welding and others. Resulting from fixedly securing of the flange 33 to the middle piece, the drive shaft 35 of the actuator 11 is connected to the rotation shaft 25 of the valve body 26 such that these both shafts 35 and 26 are rotated integrally with each other.

Through these steps, the air intake apparatus 1 assembled as shown in FIG. 1 is formed.

Next, the flange 13 in the air intake apparatus 1 is connected to the engine, the flange 12 is connected to a throttle body, and the actuator 11 is connected to an engine control portion. Meanwhile, the actuator 11 is formed so as to close the valve body 26 during a high load and low speed operation, and open the valve body 26 during a high load and high speed operation.

In addition, when the engine is operated, the intake air introduced from the throttle body enters within the intake duct 3 from the flange 12 portion, is diverted from the communicating hole 23 toward lower and upper air intake passages which are partitioned by the partitioning wall 19, and is respectively introduced into the first chamber 38 and the second chamber 41 partitioned by the partitioning wall 19 in the surge tank 2. Furthermore, the intake air having entered the first chamber 38 is supplied from the one group of intake branch pipes 5 through 7 to the engine, and the intake air having entered the second chamber 41 is supplied from the other group of intake branch pipes 8 through 10 to the engine.

In such a step, during the high load and low speed operation of the engine, the valve body 26 is closed by the actuator 11, and, during the high load and high speed operation of the engine, the valve body 26 is opened by the actuator 11, and thereby, an improvement of an output of the engine can be realized by utilizing an intake air resonance effect.

Meanwhile, in stead of the actuator 11 constituting the drive means, what can rotate the rotation shaft 25 at a predetermined angle may be employed as drive means, and the drive means such as an electric motor, electromagnetic solenoid, a diaphragm utilizing a negative pressure and the like may be used.

As described above, according to the present invention, it can prevent the breakage and changing in the characteristic of the intake air control valve resulting from the vibration adhesion. Furthermore, the partitioning wall of the surge tank is not divided, therefore, a sealing property between the first chamber and second chamber within the surge tank can be ensured.

Besides, when compared with the above conventional apparatus in which the holder provided with the valve body is inserted and arranged within the surge tank, and is sealed with the seal ring, according to the present invention, since the structure may be formed that the valve body is formed in the plate shape, the peripheral fringe thereof includes the seal members, and the seat surfaces with which the seal members of the valve body are brought into contact are formed by the partitioning wall, a reduction of component parts and assembling processes is ensured, and a decrease in manufacturing cost can also be realized.

Moreover, according to the invention, since the structure may be formed that the rotation shaft of the valve body is provided in the middle piece, the rotation shaft and the drive shaft of the drive means are separately formed, the drive means is annexed to the middle piece, and the drive shaft is rotated integrally with the rotation shaft, as a result, a common use of the same drive means can be realized with respect to the intake air control valves different in the type of machine, and a reduction in cost can be achieved.

What is claimed is:

1. An air intake apparatus of an engine, in particular, of an internal combustion engine, in which a horizontal partitioning wall is provided within a surge tank so as to divide an inner space in the surge tank into first and second chambers, and an intake air introduced into the first chamber is supplied to one group of intake branch pipes and an intake air introduced into the second chamber is supplied to the other group of intake branch pipes, wherein said surge tank is divided into a middle piece made of resin and formed integrally with the partitioning wall, a lower piece made of resin and arranged on a bottom side of the middle piece, and an upper piece made of resin and arranged on an upper side of the middle piece, and said respective pieces are bonded to each other by means of a method of vibration adhesion so as to form the surge tank, and wherein a communicating hole for making the first chamber communicate with the second chamber is formed in said partitioning wall provided in said middle piece, a valve body for opening and closing said communicating hole is provided in said communicating hole, and drive means for opening and closing said valve body is provided on the middle piece.

2. An air intake apparatus as set forth in claim 1, wherein said valve body is a plate shape and includes seal members on a peripheral fringe of the valve body, and seat surfaces with which the seal members of said valve body are brought into contact are formed by said partitioning wall.

3. An air intake apparatus as set forth in claim 2, wherein a rotation shaft of the valve body is provided in the middle piece, said rotation shaft and a drive shaft of said drive means are separately formed, and the drive means is annexed to the middle piece to rotate said drive shaft and said rotation shaft integrally with each other.

4. An air intake apparatus as set forth in claim 1, wherein a rotation shaft of the valve body is provided in the middle piece, said rotation shaft and a drive shaft of said drive means are separately formed, and said drive means is annexed to the middle piece to rotate said drive shaft and said rotation shaft integrally with each other.

* * * * *